US012422878B1

(12) United States Patent
Haney et al.

(10) Patent No.: US 12,422,878 B1
(45) Date of Patent: Sep. 23, 2025

(54) OPERATOR INTERFACE DEVICES FOR MARINE VESSELS

(71) Applicant: Navico Group Americas LLC, Menomonee Falls, WI (US)

(72) Inventors: Trevor R. Haney, Jenison, MI (US); Kevin T. Downey, Rockford, MI (US); Nils G. Johannessen, Auckland (NZ)

(73) Assignee: Navico Group Americas LLC, Menomonee Falls, WI (US)

( * ) Notice: Subject to any disclaimer, the term of this patent is extended or adjusted under 35 U.S.C. 154(b) by 0 days.

(21) Appl. No.: 18/780,015

(22) Filed: Jul. 22, 2024

(51) Int. Cl.

| | |
|---|---|
| ***G05G 1/08*** | (2006.01) |
| ***B63B 39/00*** | (2006.01) |
| ***G05G 1/10*** | (2006.01) |
| ***G05G 5/04*** | (2006.01) |
| ***G05G 5/05*** | (2006.01) |
| *G05G 1/02* | (2006.01) |

(52) U.S. Cl.
CPC ................. *G05G 1/10* (2013.01); *G05G 5/04* (2013.01); *G05G 5/05* (2013.01); *B63B 39/00* (2013.01); *G05G 1/02* (2013.01)

(58) Field of Classification Search
CPC .. G05G 1/02; G05G 1/10; G05G 1/12; G05G 5/03; G05G 5/04; G05G 5/05
See application file for complete search history.

(56) References Cited

U.S. PATENT DOCUMENTS

| | | | |
|---|---|---|---|
| 3,517,570 A * | 6/1970 | Kolb | H01H 21/24 200/419 |
| 6,377,016 B1 * | 4/2002 | Strong | B62K 23/06 318/653 |
| 6,583,728 B1 | 6/2003 | Staerzl | |
| 7,156,709 B1 | 1/2007 | Staerzl | |
| 7,416,456 B1 | 8/2008 | Gonring | |

(Continued)

FOREIGN PATENT DOCUMENTS

| | | | |
|---|---|---|---|
| KR | 0115267 Y1 * | 4/1998 | |
| WO | WO-2016084625 A1 * | 6/2016 | B62D 5/005 |

OTHER PUBLICATIONS

Dometic Trim Tab Kit, No Tabs, 2.25" Stroke, admitted prior art, available at https://www.westmarine.com/dometic-trim-tab-kit-no-tabs-2.25inch-stroke-20460416.html?&utm_medium=cpc&utm_source=google&utm_campaign=%5BADL%5D%5BPLA%5D%20Most%20Categories_%20Control&utm_content=autoag0000x21026663696x20460416&gad_source=1&gclid=EAlalQobChMI_Z2027nqhgMVItLCBB2uFQHeEAQYASABEgJM1fD_BwE, accessed Jun. 20, 2024.

(Continued)

*Primary Examiner* — Adam D Rogers
(74) *Attorney, Agent, or Firm* — Andrus Intellectual Property Law, LLP

(57) ABSTRACT

An operator interface device for a marine vessel includes a frame configured to couple to the marine vessel and a dial coupled to the frame and including a dial. The dial assembly is configured to be rotated by an operator about a dial axis into and between an initial position, a first operational position, and a second operational position. The dial assembly is rotated from the initial position toward the first operational position and when the dial assembly is released the first spring leg acts on the first dial endwall to return the dial assembly to the initial position. In addition, the dial assembly is rotated from the initial position toward the second operational position and when the dial assembly is released the second spring leg acts on the second dial endwall to return the dial assembly to the initial position.

20 Claims, 10 Drawing Sheets

(56) References Cited

U.S. PATENT DOCUMENTS

| | | | | |
|---|---|---|---|---|
| 8,056,441 | B2 * | 11/2011 | Lu | G05G 1/10 74/553 |
| 8,997,591 | B1 * | 4/2015 | Vircks | G05G 5/03 200/11 R |
| 9,359,057 | B1 | 6/2016 | Andrasko | |
| 10,082,788 | B1 | 9/2018 | Dengel | |
| 10,137,971 | B2 | 11/2018 | Andrasko | |
| 10,248,153 | B2 * | 4/2019 | Stoufer | G05G 5/05 |
| 10,518,173 | B2 | 12/2019 | Tang | |
| 10,807,470 | B2 * | 10/2020 | Senba | A61G 5/10 |
| 11,597,407 | B2 * | 3/2023 | Kim | B60W 10/10 |
| 11,933,502 | B2 * | 3/2024 | Cowan | F24C 7/082 |
| 2021/0054924 | A1 * | 2/2021 | Kim | F16H 59/08 |

OTHER PUBLICATIONS

Bennett Marine BEA3000 Bolt Adjustable Actuator, Nov. 24, 2015, available at https://www.amazon.com/Bennett-Marine-BEA3000-Adjustable-Actuator/dp/B01ATUT1G4/ref=asc_df_B01ATUT1G4/? gad_source=1&hvadid=693649825862&hvdev=c&hvdvcmdl&hvlocint&hvlocphy=1016367&hvnetw=g&hvpone&hvpos&hvptwo&hvqmt&hvrand=6873072191823823176&hvtargid=pla-571225686948&linkCode=df0&mcid=7abca8ee61dd3b45a40d5a2f3102c258&psc=1&tag=hyprod-20, accessed Jun. 20, 2024.

Lectrotab, A-Bk Standard Trim Tab Actuator—w/6' Cable, May 20, 2020, available at https://www.amazon.com/LECTROTAB-Standard-Trim-Tab-Actuator/dp/B088X2XMT4/ref=asc_df_B088X2XMT4/?tag=hyprod-20&linkCode=df0&hvadid=693270340473&hvpos=&hvnetw=g&hvrand=16797349554188911656&hvpone=&hvptwo=&hvqmt=&hvdev=c&hvdvcmdl=&hvlocint=&hvlocphy=1016367&hvtargid=pla-1654091431885&psc=1&mcid=b3a3e978ef2133aba08c508a5a8a3cce&gad_source=1, accessed Jun. 20, 2024.

"LED Indicator (Two-Piece) Dual Kit—12 & 24-Volt—Dual Actuator Systems" accessed from https://www.lencomarine.com/en/p/15271-001/LED-Indic-Two-Piece-Dual-Kit-12 on Jul. 11, 2024.

Zipwake "Control Panel" accessed from https://zipwake.com/series-s/control-panel/ on Jul. 11, 2024.

Zipwake "Mini Controller" accessed from https://zipwake.com/mini-controller/ on Jul. 11, 2024.

* cited by examiner

OPERATOR INTERFACE DEVICES FOR MARINE VESSELS

FIELD

The present disclosure relates to marine vessels, and particularly to operator interface devices for controlling components or systems of marine vessels.

BACKGROUND

The following U.S. patent is incorporated herein by reference in entirety.

U.S. Pat. No. 10,082,788 discloses a system for controlling steering and thrust of a marine vessel's propulsion device having a joystick assembly providing input signals to a control module. The joystick assembly includes a docking station at the helm; a first electrical connector in the docking station cable-connected to the control module; a detachable base for coupling with the docking station; a handle moveable within the detachable base to generate the input signals; a second, complementary electrical connector in the detachable base; and a wireless transmitter mounted in the detachable base.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an operator interface device for a marine vessel includes a frame configured to couple to the marine vessel and a dial coupled to the frame and including a first spring leg, a second spring leg, and a dial assembly having a first dial endwall and a second dial endwall. The dial assembly is configured to be rotated by an operator about a dial axis into and between an initial position, a first operational position, and a second operational position. Rotation of the dial assembly in a first direction from the initial position toward the first operational position causes the first dial endwall to engage the first spring leg, and when the dial assembly is released the first spring leg acts on the first dial endwall to return the dial assembly to the initial position. In addition, rotation of the dial assembly in a second direction from the initial position toward the second operational position causes the second dial endwall to engage the second spring leg and when the dial assembly is released the second spring leg acts on the second dial endwall to return the dial assembly to the initial position A sensor assembly is configured to sense movement of the dial assembly and generate a signal corresponding to the movement of the dial assembly.

According to some examples, the dial further includes a first body endwall and a second body endwall such that the second dial endwall engages the first body endwall thereby preventing rotation of the dial assembly in the first direction past the first operational position and the first dial endwall engages the second body endwall thereby preventing rotation of the dial assembly in the second direction past the second operational position. According to some examples, the dial includes a rotationally fixed dial body that includes the first body endwall and the second body endwall. According to some examples, the dial assembly has a rotatable dial frame that includes the first dial endwall and the second dial endwall. According to some examples, the dial assembly defines a first pocket in which the first spring leg is received and a second pocket in which the second spring leg is received. According to some examples, the first pocket and the second pocket are located between the first dial endwall and the second dial endwall. According to some examples, the dial assembly includes a dividing wall between the first pocket and the second pocket. According to some examples, the dial includes a first lip that engages the second spring leg and a second lip that engages the first spring leg. According to some examples, the dial includes a first lip and a second lip and when the dial assembly is in the first operational position, the first spring leg is spaced apart from the second lip and the second spring leg engages the first lip and when the dial assembly is in the second operational position, the first spring leg engages the second lip and the second spring leg engages the first lip. According to some examples, when the dial assembly is in the initial position, the first spring leg engages the second lip and the second spring leg engages the first lip. According to some examples, the dial includes a spring having the first spring leg and the second spring leg. According to some examples, the dial includes a rotationally fixed dial body having a rod around which the spring is located. According to some examples, the dial includes a rotationally fixed dial body defining a channel in which the spring is located. According to some examples, the sensor assembly is configured to sense rotational movement of the dial assembly. According to some examples, the sensor assembly includes a Hall-Effect sensor. According to some examples, the sensor assembly includes a magnet coupled to and rotatable with the dial assembly. According to some examples, the dial assembly includes a bore and an arm that holds the magnet in the bore, wherein the arm radially extends into the bore.

According to one example of the present disclosure, an operator interface device on a marine vessel for receiving an input from an operator includes a dial configured to receive the input from the operator. The dial includes a dial body that is rotationally fixed relative to the marine vessel and a dial assembly having a dial frame and a dial ring that is configured to be rotated together about a dial axis into and between an initial position, a first operational position, and a second operational position. The dial frame including a first dial endwall and a second dial endwall. The dial also includes a spring with a first spring leg and a second spring leg. Rotation of the dial assembly in a first direction from the initial position toward the first operational position causes the first dial endwall to engage the first spring leg, and when the dial assembly is released, the first spring leg acts on the first dial endwall to return the dial assembly to the initial position. In addition, rotation of the dial assembly in a second direction from the initial position toward the second operational position causes the second dial endwall to engage the second spring leg, and when the dial assembly is released the second spring leg acts on the second dial endwall to return the dial assembly to the initial position. A sensor assembly is configured to sense movement of the dial assembly and generate a signal corresponding to movement of the dial assembly.

According to some examples, the dial body includes a first body endwall and a second body endwall such that the second dial endwall engages the first body endwall thereby preventing rotation of the dial assembly in the first direction past the first operational position and the first dial endwall engages the second body endwall thereby preventing rotation of the dial assembly in the second direction past the second operational position. According to some examples, the dial body includes a first lip that engages the second spring leg and a second lip that engages the first spring leg.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Before any examples of the invention are explained in detail, it is to be understood that the invention is not limited in its application to the details of construction and the arrangement of components set forth in the following description or illustrated in the following drawings. The invention is capable of other examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular examples or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or examples. Additionally, use of the words "first," "second", "third," etc. is not intended to connote priority or importance, but merely to distinguish one of several similar elements from another.

Figure 1:
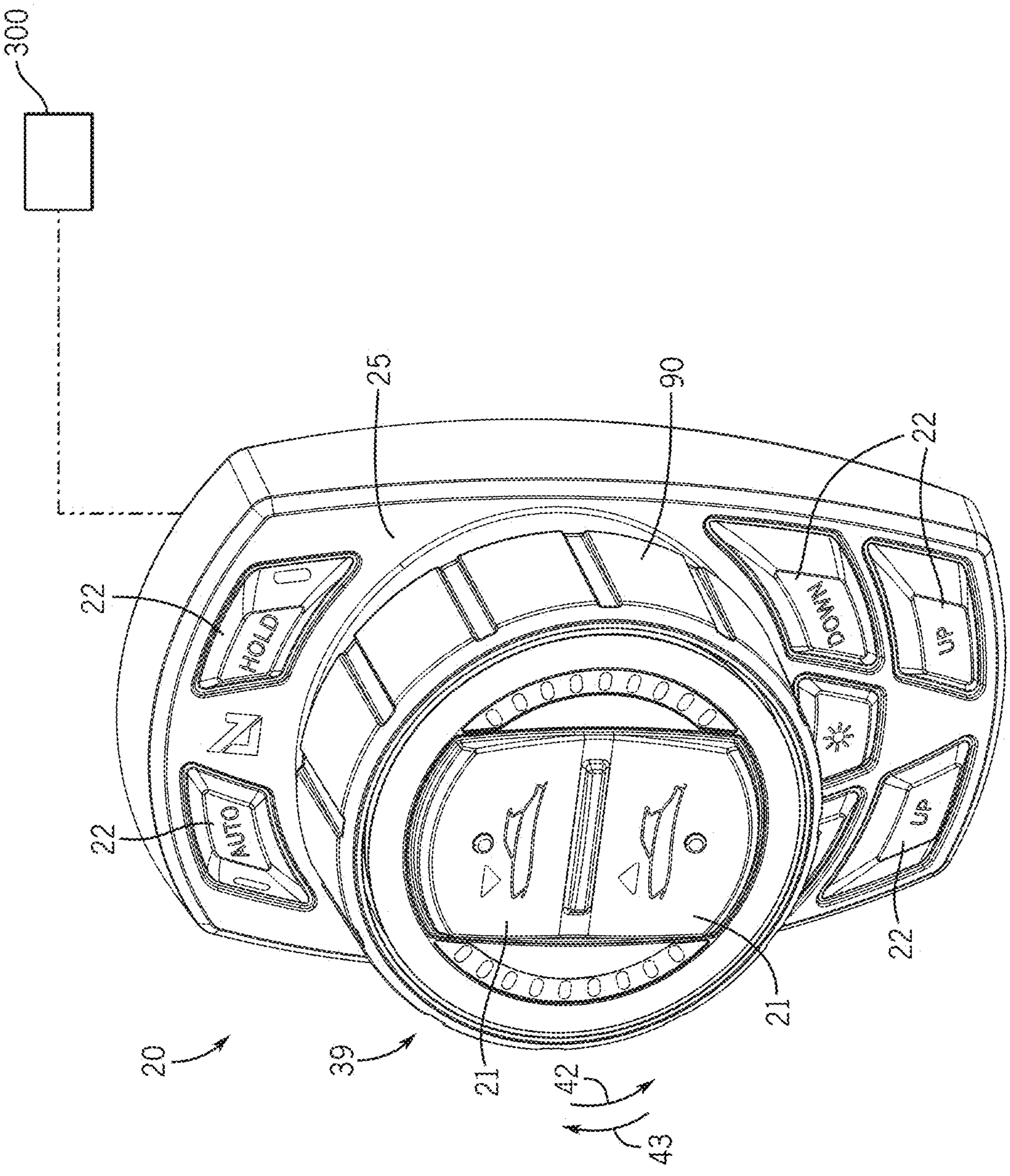
FIG. 1 is a perspective view of an example operator interface device according to the present disclosure.
Figure 2:
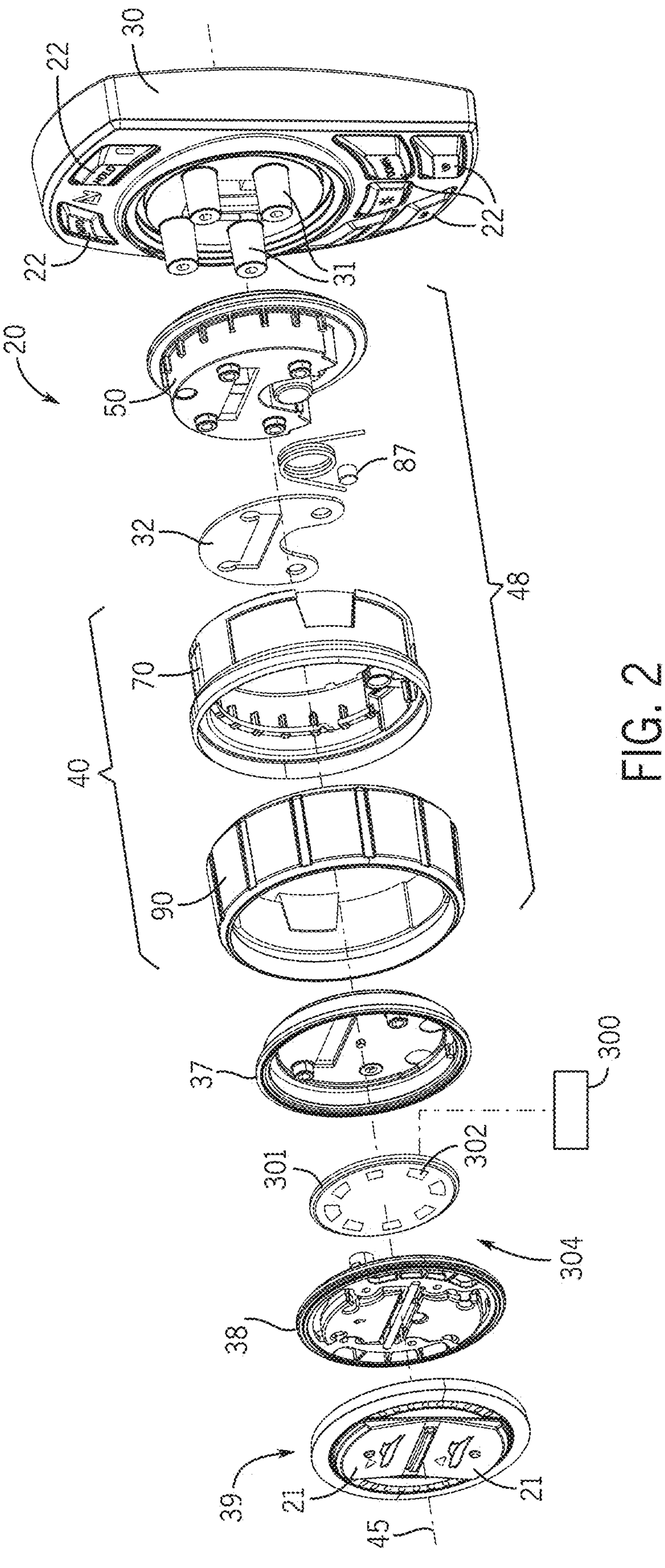
FIG. 2 is an exploded view of the operator interface device of FIG. 1.

FIGS. 1-2 depict an example operator interface device 20 according to the present disclosure. The operator interface device 20 is for receiving one or more inputs from the operator of a marine vessel, and the inputs received are utilized by a control system 300 of the marine vessel to control one or more components or systems of the marine vessel. The manner in which the operator engages and enters the inputs into the operator interface device 20 can vary. For example, the operator interface device 20 includes one more buttons 21 for trimming the bow of the marine vessel. The operator engages (e.g., depresses, touches) one of the buttons to trim the bow of the marine vessel up and the other button to trim the bow of the marine vessel down. Based on the input, the control system controls a trim actuator (not depicted) or trim tabs (not depicted) to trim up or trim down the marine vessel. Exemplary trim actuators and sensors are disclosed in U.S. Pat. Nos. 6,583,728; 7,156,709; 7,416,456; 9,359,057; and 10,137,971, which are incorporated by reference in entirety herein.

The operator interface device 20 also includes a dial 48 for rolling the marine vessel in the starboard direction or the port direction. The operator engages (e.g., uses one or more fingers) to move a dial assembly 40 (described herein) of the dial 48 about a dial axis 45 in either a first direction 42 (e.g., clockwise direction) or a second direction 43 (e.g., counterclockwise direction). Rotating the dial assembly 40 in the first direction 42 causes the control system 300 to control one or more actuators or trim tabs to roll the marine vessel in the starboard direction. Similarly, rotating the dial assembly 40 in the second direction 43 causes the control system 300 to control one or more actuators or trim tabs to roll the marine vessel in the port direction.

The functions of trimming bow and rolling the marine vessel noted above are merely exemplary, and it should be understood that the operator interface device 20 of the present disclosure, including the interfaces, buttons, dials, etc. thereof, can be adapted to receive inputs from the operator for operating other components or systems of the marine vessel (e.g., lighting, speakers, cooling systems, engine cooling systems, pumps).

The present inventors developed the operator interfaces devices 20 of the present disclosure to be novel and include advantageous features relative to conventional operator interface devices. For example, as will be described in greater detail herein below, the dial assembly 40 of the present disclosure provides predetermined rotational limits such that the dial assembly 40 only rotates a predetermined amount in either direction 42, 43. In contrast, conventional dials do not have predetermined rotational limits and may rotate 360.0 degrees and more. The dial assembly 40 of the present disclosure is further configured to automatically return to a predetermined, initial position after the operator releases the dial assembly 40. These example novel and non-obvious features of the dial assembly 40 of the present disclosure (along with other features and/or components) are described in greater detail therein below.

As noted above, the operator interface device 20 includes the one or more buttons 21 that receive input(s) from the operator. The buttons 21 are for controlling one or more systems or components of the marine vessel. The operator interface device 20 also includes one or more auxiliary buttons 22 for controlling other components or systems of the marine vessel or customizing the manner in which the control system controls the components or systems such as such as increasing or decreasing volume of speaker systems, adjusting light intensity of lights, holding current settings, and/or moving into a preset selection of controls. The buttons 21, 22 are formed by a frame 30 (FIG. 2) having one or more mechanical members (e.g., tabs, flanges, bosses). Electrical components (not depicted; e.g., switches, wires, sensors, magnets) are connected to the frame 30 and in communication with the buttons 21, 22. The frame 30 is mounted to the marine vessel. For example, the frame 30 is mounted on a sidewall or a console of the marine vessel. The buttons 21, 22 also include portions of a flexible cover 25 (see FIG. 1) that covers the frame 30 and prevents debris and moisture from damaging the frame 30 and related mechanical and electrical components. The cover 25 can be formed of any suitable material such as plastic or rubber, and the cover 25 can include indica (e.g., recesses, projections, letters, symbols) for indicating the location and function of the buttons 21, 22.

Figure 3:
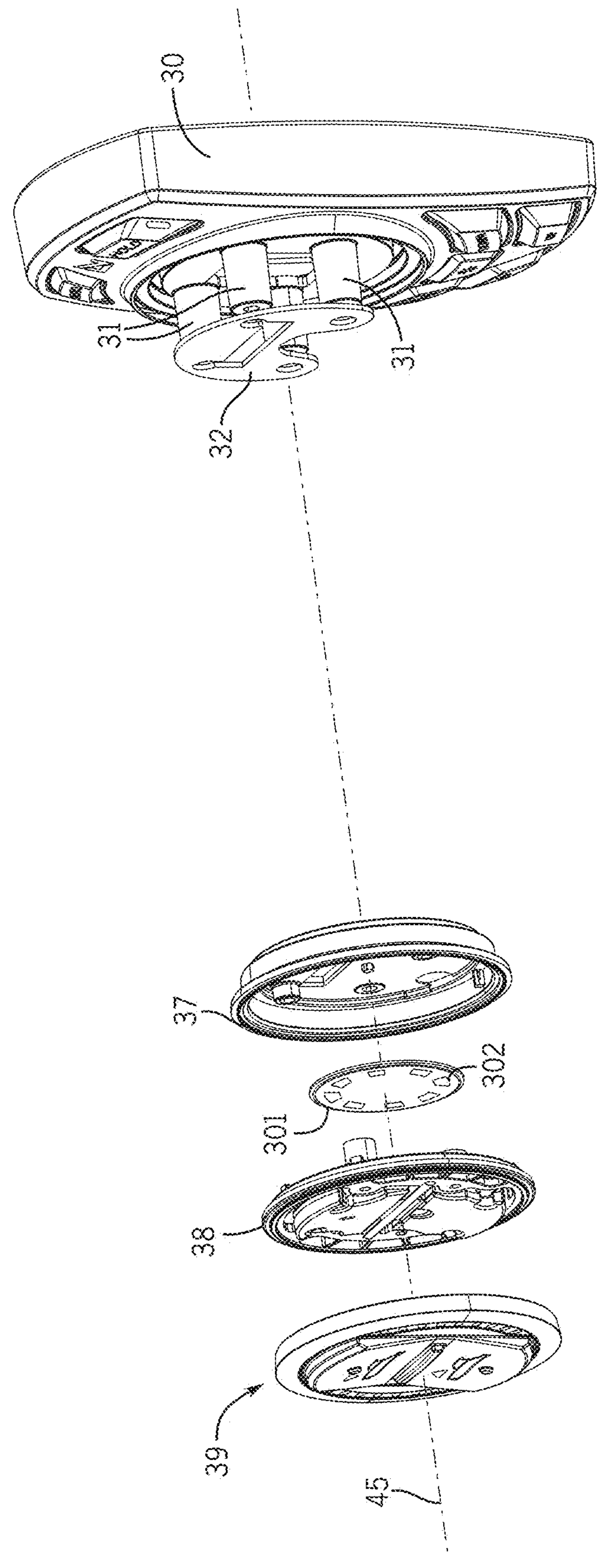
FIG. 3 is an exploded view depicting certain components of the operator interface device of FIG. 1.

Turning now to FIG. 3, the frame 30 includes axially extending threaded bosses 31 that are connected to a subframe 32. The subframe 32 and the bosses 31 are axially fixed to the frame 30 and do not rotate relative to the frame 30. A housing 37 is coupled to the subframe 32 with fasteners (not depicted; e.g., bolts, screws) that extend into the bosses 31. A button frame 38 is coupled to the housing 37, and a button assembly 39 having one or more buttons 21 is coupled to the button frame 38. The button frame 38, the button assembly 39, and the buttons 21 attached thereto are axially fixed in place relative to each other and do not rotate.

Figure 4:
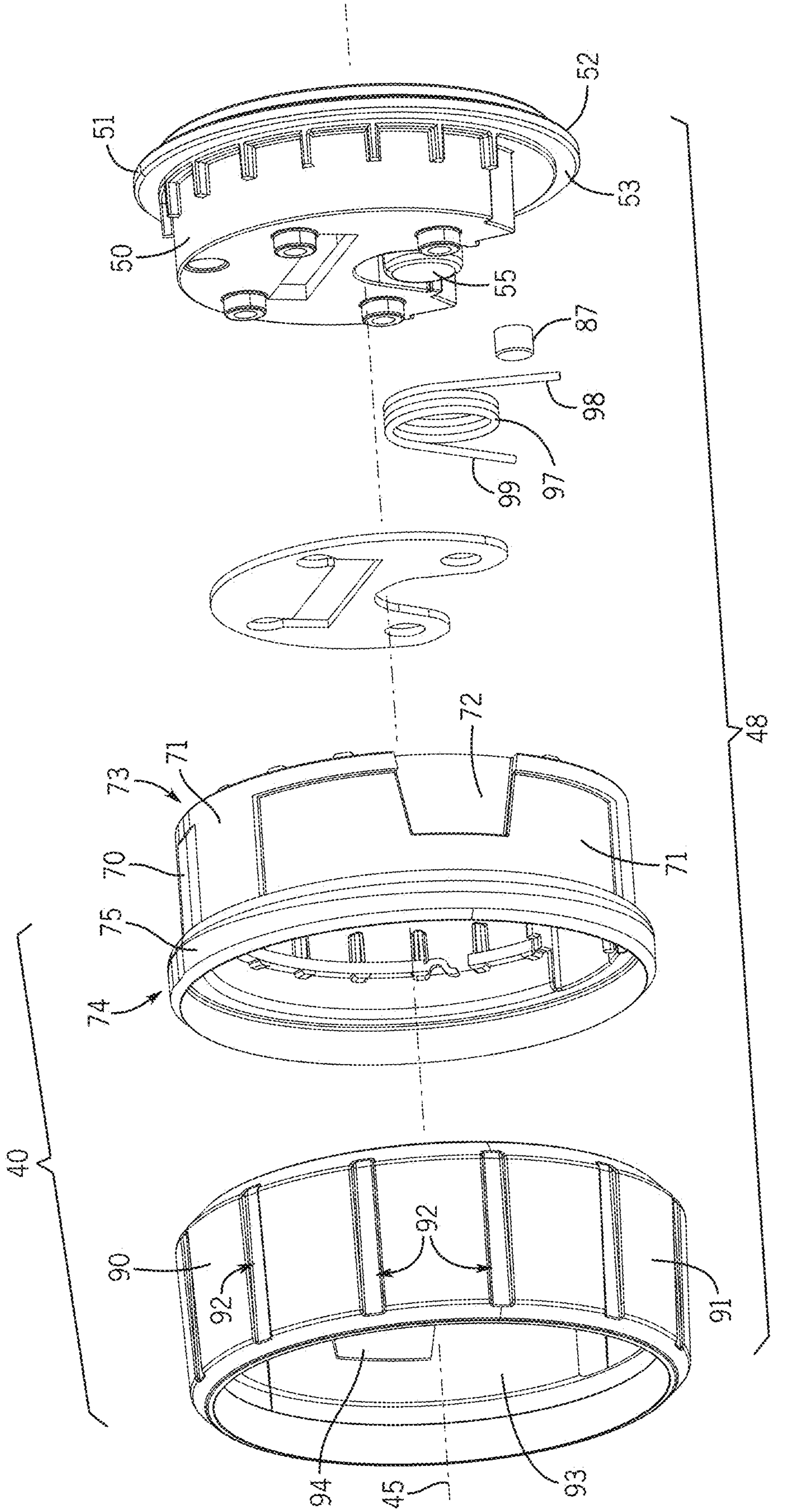
FIG. 4 is an exploded view depicting other components of the operator interface device of FIG. 1.

Turning now to FIG. 4, the example dial 48 is depicted in greater detail. The dial 48 extends along a dial axis 45. The dial 48 includes a dial body 50 that is coupled to the subframe 32 (FIG. 3). The fasteners (not depicted) couple the dial body 50 to the subframe 32 (FIG. 3) such that the dial body 50 does not rotate about the dial axis 45. A dial frame 70 is rotatably coupled to the dial body 50 about a dial axis 45, and a dial ring 90 is coupled to the dial frame 70 and configured to rotate with the dial frame 70 about the dial axis 45. The dial frame 70 and the dial ring 90 can be collectively referred to the dial assembly 40 herein. The dial body 50, the dial frame 70, and the dial ring 90 are described further herein.

Figure 6:
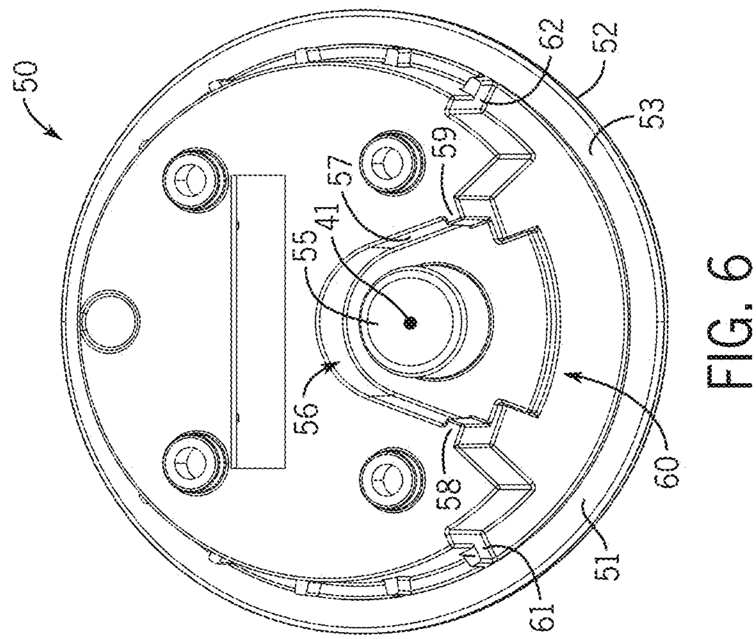
FIGS. 5-6 are perspective views of an example dial body according to the present disclosure.
Figure 5:
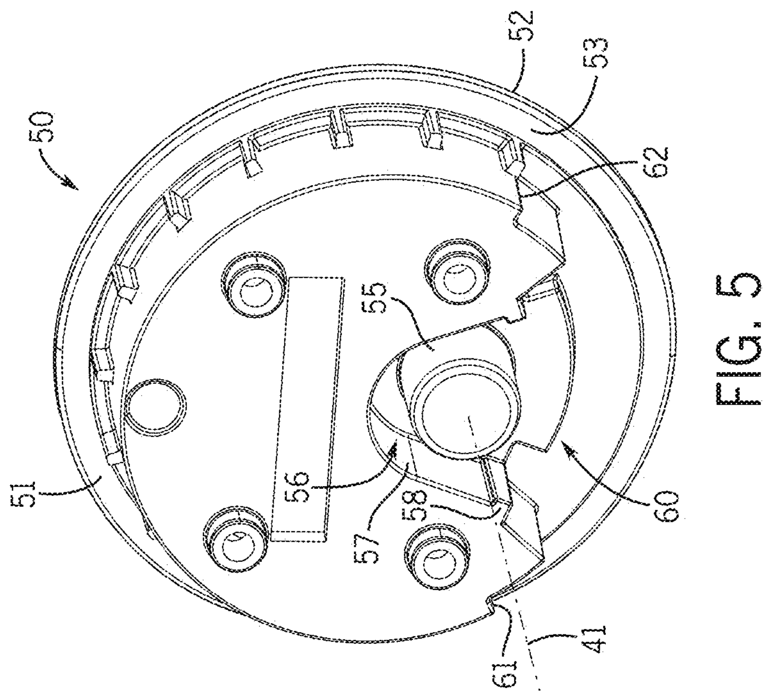

FIGS. 5-6 depict the dial body 50 in greater detail. The dial body 50 includes a perimeter flange 51 with a first flange surface 52 (FIG. 4) that faces and/or is coupled to the frame 30 (FIG. 3) and an opposite second flange surface 53 that faces and/or engages the dial frame 70 (FIG. 4). A rod 55 extends along a frame axis 41 and a channel 56 at least partially encircles the rod 55. The channel 56 is at least partially defined by a sidewall 57. A first lip 58 is located at one end of the sidewall 57 and a second lip 59 is located at the other end of the sidewall 57. The channel 56 is adjacent to a cavity 60. A first body endwall 61 and a second body endwall 62 are circumferentially spaced apart from each other and the body endwalls 61, 62 partially define the outer radial extents of the cavity 60.

Figure 8:
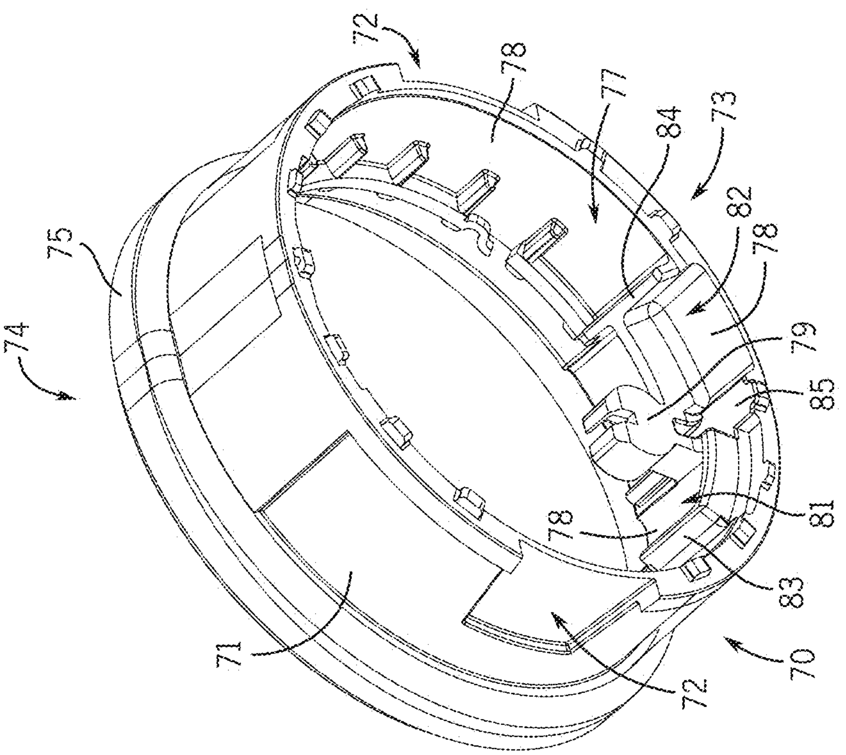
FIGS. 7-8 are perspective views of an example dial frame according to the present disclosure.
Figure 7:
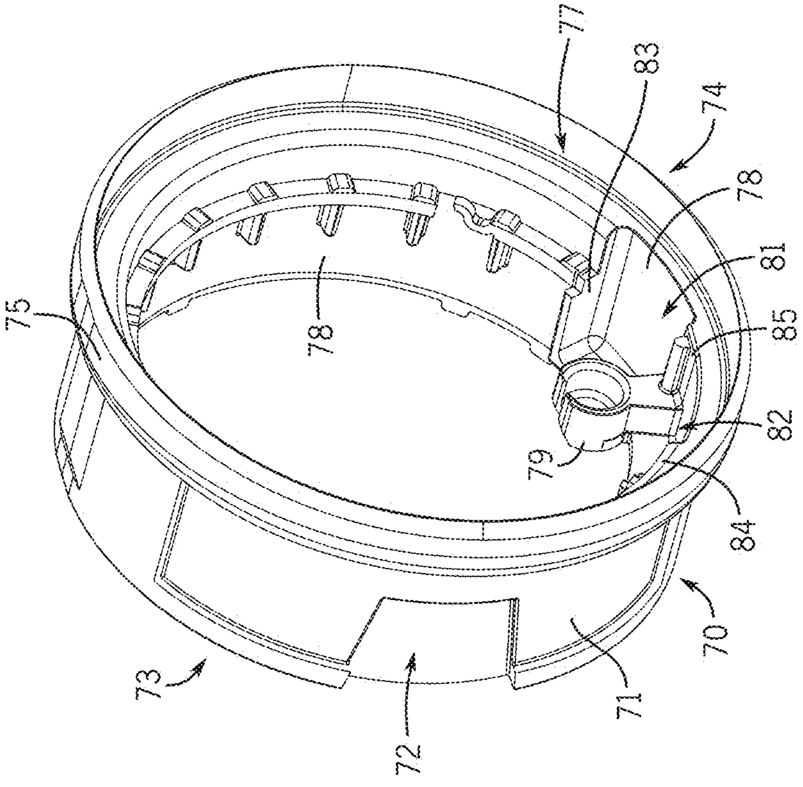

FIGS. 7-8 depict the dial frame 70 in greater detail. The dial frame 70 has an outer perimeter surface 71 and a plurality of keyways 72 defined therein. The dial frame 70 has a first end 73 oriented toward the frame 30 (FIG. 2) and an opposite second end 74. A dial flange 75 is located at the second end 74. The dial flange 75 radially outwardly extends from the outer perimeter surface 71. The dial frame 70 defines a bore 77 that is at least partially defined by an inner perimeter surface 78. Note the inner perimeter surface 78 can include several surfaces which may or may not be contiguous with each other. The dial frame 70 includes an arm 79 that radially inwardly extends from the inner perimeter surface 78 into the bore 77. The arm 79 holds a magnet 87 (FIG. 2) that may be part of a sensor assembly 304 (see FIG. 2) that also includes a sensor 302 (e.g., Hall-Effect sensor) for sensing movement (e.g., rotation) of the dial assembly 40. The sensor 302 is mounted on a circuit board 301 (e.g., printed circuit board).

The dial frame 70 also defines a first pocket 81 at least partially defined by a first dial endwall 83 and a second pocket 82 at least partially defined by a second dial endwall 84. A dividing wall 85 separates the pockets 81, 82. The dial endwalls 83, 84 are circumferentially offset from each other. One or more springs 97 (See FIG. 4) (e.g., torsion spring) are positioned around the rod 55 such that a spring leg 98, 99 extends into each of the pockets 81. For example, a first spring leg 98 extends into the first pocket 81 and a second spring leg 99 extends into the second pocket 82 (see FIG. 11). In certain examples, the first spring leg 98 engages the second lip 59 and the second spring leg 99 engages the first lip 58. In certain examples, a single spring 97 includes both spring legs 98, 99.

Figure 10:
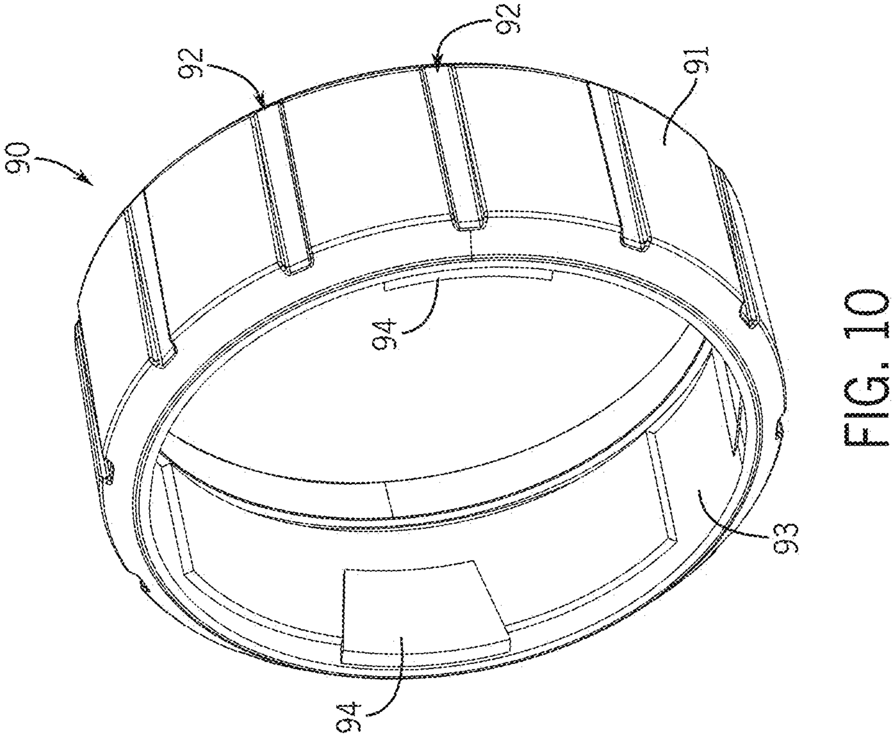
FIGS. 9-10 are perspective views of an example dial ring according to the present disclosure.
Figure 9:
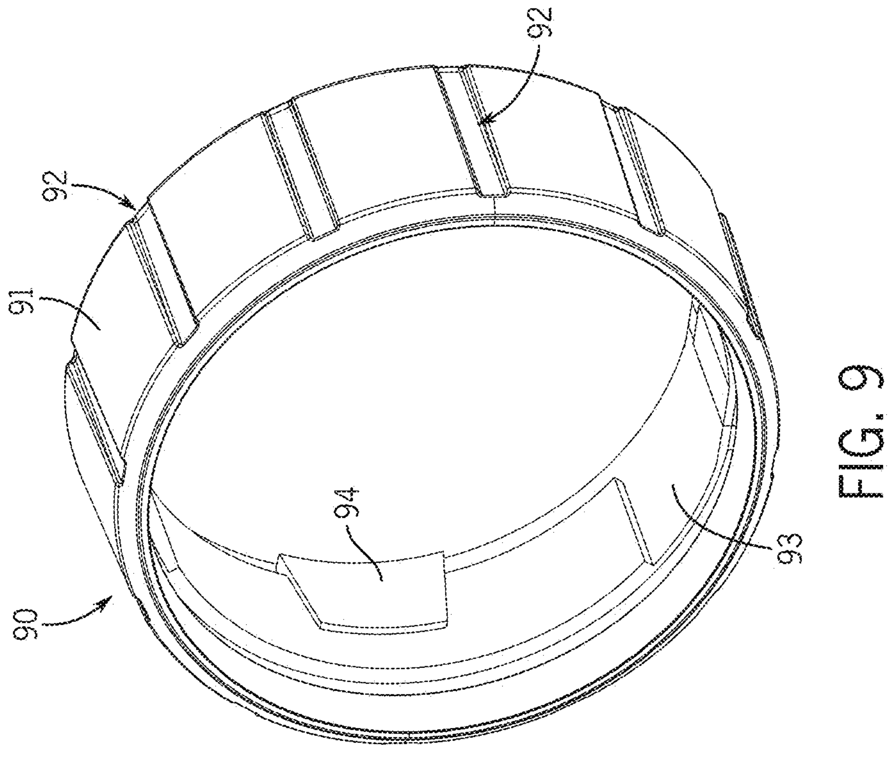

FIG. 9-10 depict the dial ring 90 in greater detail. The dial ring 90 has an outer perimeter surface 91 with a plurality of recesses 92 thereon. The recesses 92 aid the operator in gripping and rotating the dial ring 90. The dial ring 90 also has an inner perimeter surface 93 that faces the outer perimeter surface 71 of the dial frame 70, and a plurality of keys 94 extend radially inwardly from the inner perimeter surface 93. The keys 94 are received into the keyways 72 of the dial frame 70 thereby rotatably fixing the dial ring 90 to the dial frame 70 (e.g., the dial ring 90 rotates with the dial frame 70).

Figure 11:
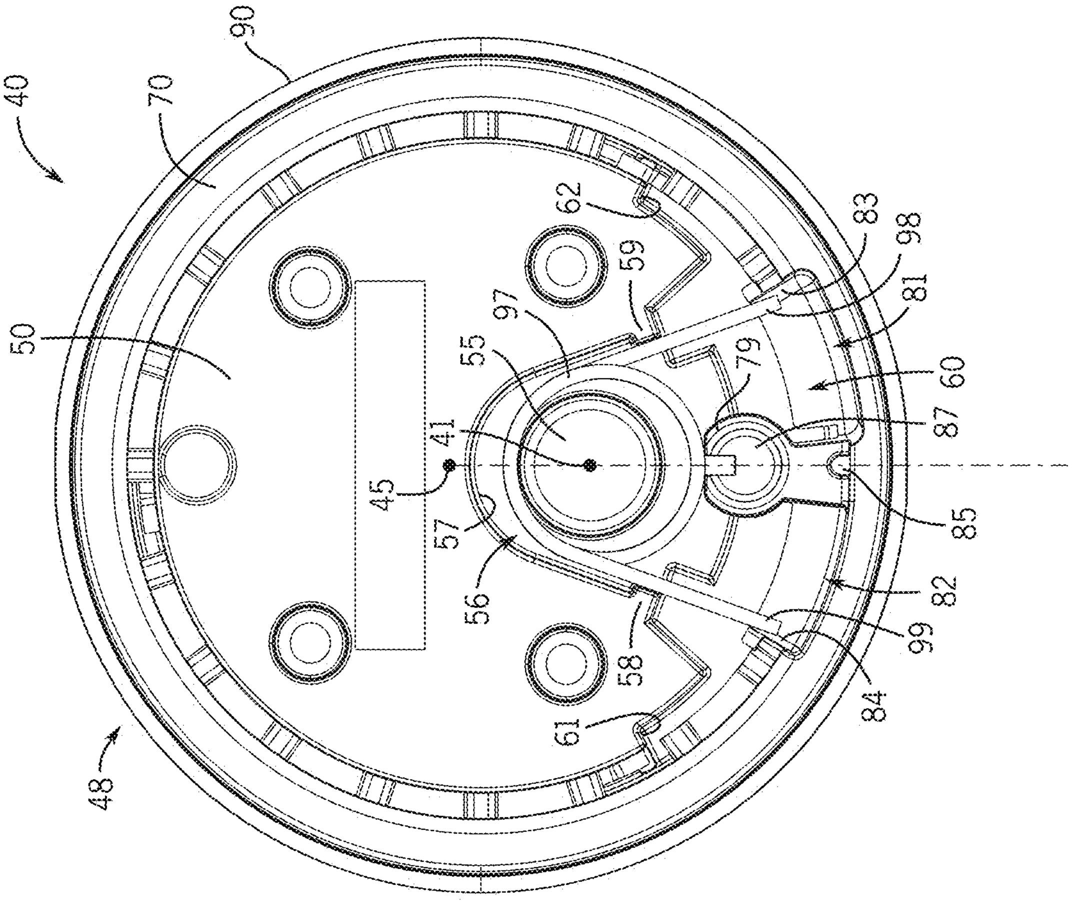
FIG. 11 is a cross-sectional view of an example dial assembly of the present disclosure in an initial position.
Figure 12:
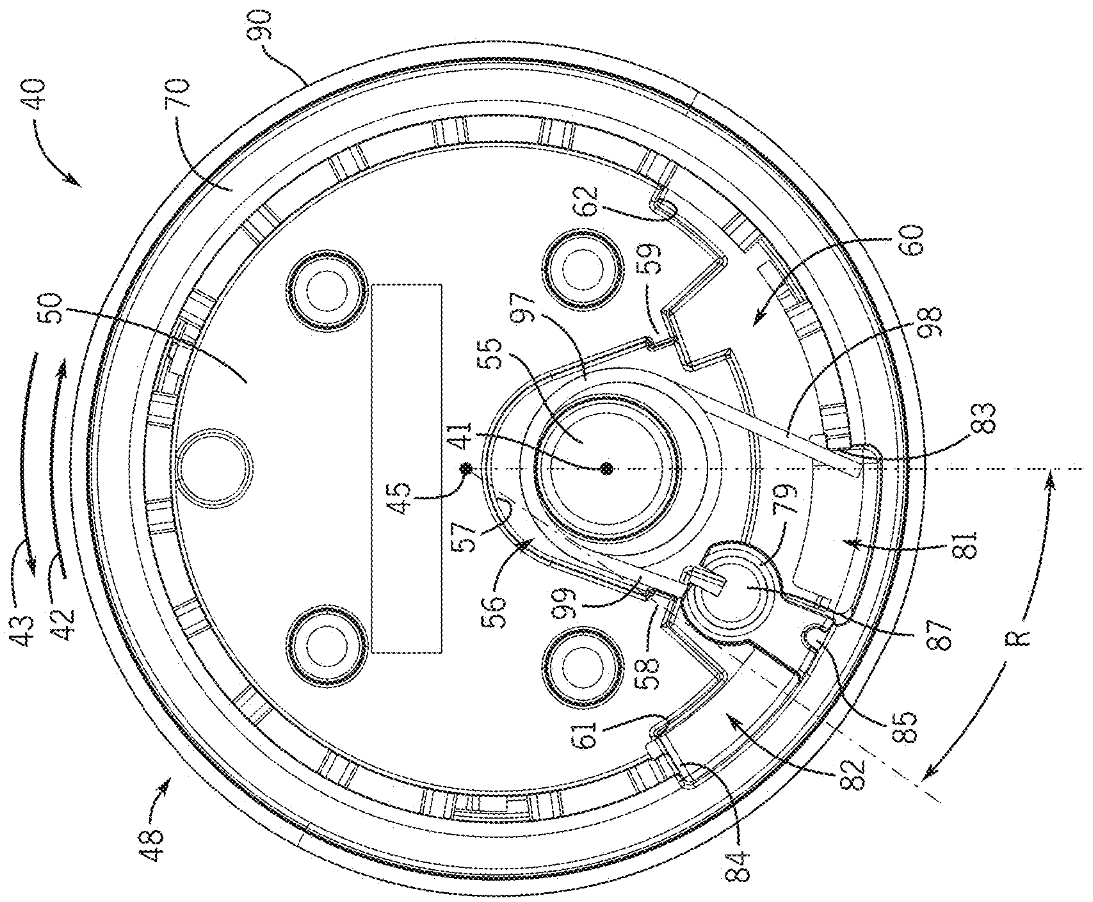
FIG. 12 is a cross-sectional view of an example dial assembly of the present disclosure in a first operational position.
Figure 13:
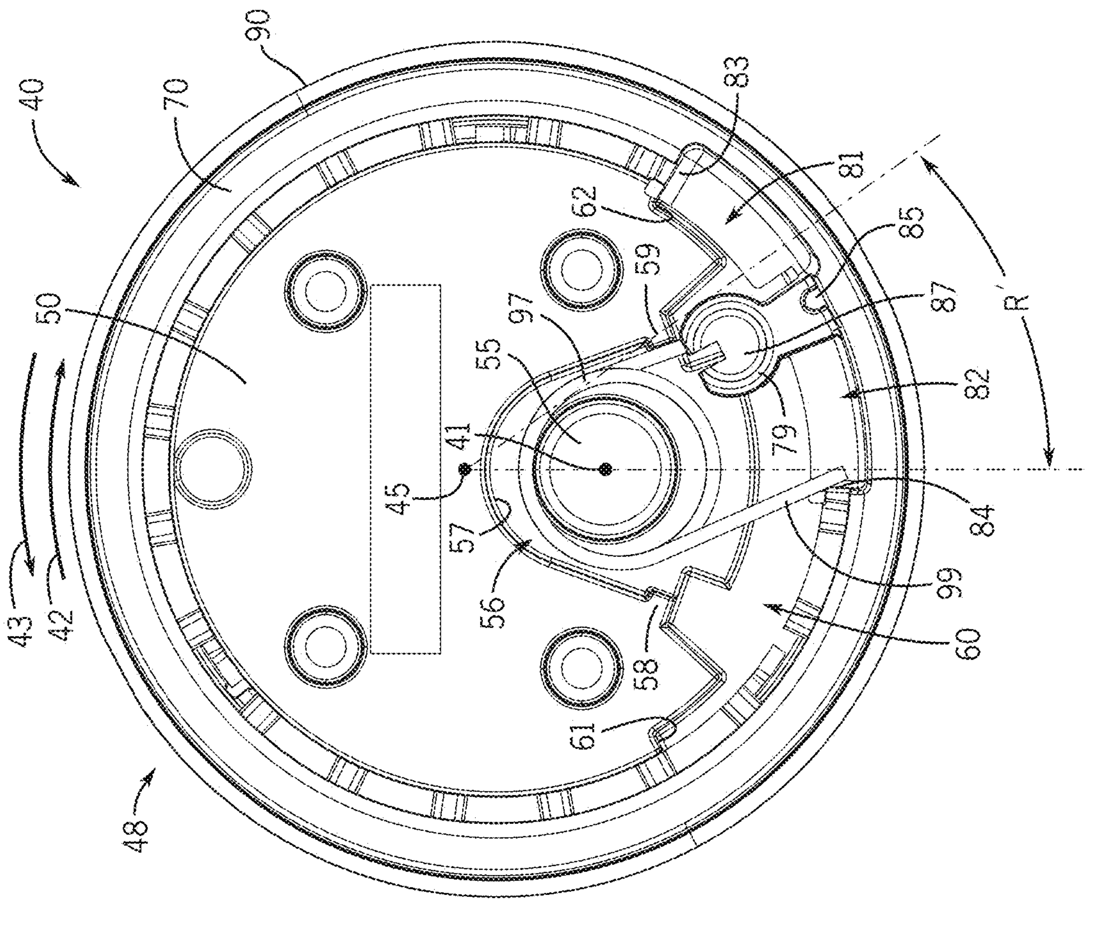
FIG. 13 is a cross-sectional view of an example dial assembly of the present disclosure in a second operational position.

Turning now to FIGS. 11-13, the dial assembly 40 is depicted in different operational positions.

FIG. 11 depicts the dial assembly 40 in an initial or 'home' position. In the initial position, the first spring leg 98 is in the first pocket 81 and the second spring leg 99 is in the second pocket 82. In certain examples, the first spring leg 98 is braced against the first dial endwall 83 and/or the second spring leg 99 is braced against the second dial endwall 84.

FIG. 12 depicts the dial assembly 40 moved into a first operational position by the operator. The operator moves the dial assembly 40 into the first operational position by engaging and rotating the dial ring 90 in a first direction 42. The rotation of the dial ring 90 causes the dial frame 70 to also rotate in the first direction 42. As the dial frame 70 is rotated, the first dial endwall 83 acts on the first spring leg 98 thereby moving the first spring leg 98 in the first direction 42. The first spring leg 98 is moved against the spring force in the spring 97 that biases the first spring leg 98 in the opposite second direction 43. The arm 79 and the magnet 87 (FIG. 2) rotate with the dial frame 70. The movement of the dial ring 90, the dial frame 70, and the first spring leg 98 continues until the second dial endwall 84 engages the stationary first body endwall 61. As such, the operator can no longer rotate the dial assembly 40 in the first direction 42. In certain examples, the second spring leg 99 remains in the second pocket 82 and/or is spaced apart from the second dial endwall 84.

Note that the amount of rotation that the dial assembly 40 is moved from the initial position (FIG. 11) to the first operational position (FIG. 12) can vary. For example, the dial assembly 40 can be moved 15.0 degrees between the initial position and the first operational position. Note that dash-dot lines exemplarily depict the angle of rotation R of the dial assembly between the initial position and the first operational position.

Upon moving the dial assembly 40 to the first operational position, the control system 300 receives a corresponding signal from the sensor assembly 304 (e.g., the sensor assembly includes a Hall-Effect sensor which senses the movement of the magnet 87 held in the arm 79) and thereby logs or determines the rotation of the dial assembly 40 as one first input. The operator then releases the dial ring 90 such that the spring force of the spring 97 acting via the first spring leg 98 on the first dial endwall 83 automatically moves the dial assembly 40 back to the initial position. As such, the spring 97 returns the dial assembly 40 back to the initial position (FIG. 11).

The operator can optionally reengage the dial assembly 40 to move the dial assembly 40 back to the first operational position thereby causing the control system 300 to log an additional first input. Note that the control system 300 can be configured to add subsequent first inputs to determine a total or cumulative amount of first inputs that are received by the dial 48. Based on the number of first inputs, the control system 300 is configured to control a component of the marine vessel, such as actuating trim tabs in a position that corresponds with the number of first inputs. The control system 300 can also be configured to indicate (e.g., a plurality of LEDs, a graphic on a touchscreen display) the number of first inputs and/or the position of the component controlled by the dial 48.

The operator may also hold the dial assembly 40 in the first operational position. In these examples, the control system 300 is capable of determining that multiple first inputs are received with a timer and based on the length of time the dial assembly 40 is held in the first operational position. For instance, the operator holds the dial assembly 40 in the first operational position for 4.0 seconds and the control system 300 determines that four first inputs were entered by the operator.

FIG. 13 depicts the dial assembly 40 moved into a second operational position by the operator. The operator moves the dial assembly 40 into the second operational position by engaging and rotating the dial ring 90 in the second direction 43. The rotation of the dial ring 90 causes the dial frame 70 to also rotate in the second direction 43. As the dial frame 70 is rotated, the second dial endwall 84 acts on the second spring leg 99 thereby moving the second spring leg 99 in the second direction 43. The second spring leg 99 is moved against the spring force in the spring 97 that biases the second spring leg 99 in the opposite first direction 42. The arm 79 and the magnet rotate with the dial frame 70. The movement of the dial ring 90, the dial frame 70, and the first spring leg 98 continues until the first dial endwall 83 engages the stationary second body endwall 62. As such, the operator can no longer rotate the dial assembly in the second direction 43. In certain examples, the first spring leg 98 remains in the first pocket 81 and/or is spaced apart from the first dial endwall 83.

The amount of rotation that the dial assembly 40 is moved from the initial position (FIG. 11) to the second operational position (FIG. 13) can vary. For example, the dial assembly 40 can be moved 15.0 degrees from the initial position to the second operational position. Note that dash-dot lines exemplarily depict the angle of rotation R' of the dial assembly 40 between the initial position and the second operational position.

Upon moving dial assembly 40 to the second operational position, the control system 300 receives a corresponding signal from one or more electrical components of the dial assembly 40 (e.g., a Hall-Effect sensor which senses the movement of the magnet 87 held in the arm 79) and thereby logs the rotation of the dial assembly 40 as one second input. The operator then releases the dial ring 90 such that the spring force of the spring 97 acting via the second spring leg 99 on the second dial endwall 84 automatically moves the dial assembly 40 back to the initial position. As such, the spring 97 returns the dial assembly 40 back to the initial position.

The operator can optionally reengage the dial assembly 40 to move the dial assembly 40 back to the second operational position thereby causing the control system 300 to log an additional second input. Note that the control system 300 can be configured to add subsequent second inputs to determine a total or cumulative amount of second inputs that are received into the dial 48. Based on the number of second inputs, the control system 300 is configured to control another component of the marine vessel, such as actuating trim tabs in a position that corresponds with the amount of second inputs. The control system 300 can also be configured to indicate (e.g., a plurality of LEDs, a graphic on a touchscreen display) the number of second inputs and/or the position of the component controlled by the dial 48.

The operator may also hold the dial assembly 40 in the second operational position. In these examples, the control system 300 is capable of determining that several second inputs are received with a timer, and based on the length of time the dial assembly 40 is held in the second operational position. For instance, the operator holds the dial assembly 40 in the second operational position for 4.0 seconds and the control system 300 determines that four second inputs were entered by the operator.

The control system 300 is also configured to subtract the total number of the first inputs from the total number of second inputs based on the manner in which the operator rotates the dial assembly 40. For instance, the operator may move the dial assembly 40 four times from the initial position to the first operational position and thereby the control system 300 determines that four first inputs were entered by the operator. The operator may then subsequently move the dial assembly 40 three times from the initial position to the second operational position, and thereby the control system 300 determines there three second inputs were entered by the operator. The control system 300 subtracts the three second inputs from the four first inputs to arrive at one first input. The control system 300 then controls the corresponding component of the marine vessel to a position to corresponds to the one first input.

According to one example of the present disclosure, an operator interface device for a marine vessel includes a frame configured to couple to the marine vessel, a dial coupled to the frame and including a first spring leg, a second spring leg, and a dial assembly having a first dial endwall and a second dial endwall. The dial assembly is configured to be rotated by an operator about a dial axis into and between an initial position, a first operational position, and a second operational position. Rotation of the dial assembly in a first direction from the initial position toward the first operational position causes the first dial endwall to engage the first spring leg, and when the dial assembly is released the first spring leg acts on the first dial endwall to return the dial assembly to the initial position. In addition, rotation of the dial assembly in a second direction from the initial position toward the second operational position causes the second dial endwall to engage the second spring leg and when the dial assembly is released the second spring leg acts on the second dial endwall to return the dial assembly to the initial position A sensor assembly is configured to sense movement of the dial assembly and generate a signal corresponding to the movement of the dial assembly.

According to some examples, the dial further includes a first body endwall and a second body endwall such that the second dial endwall engages the first body endwall thereby preventing rotation of the dial assembly in the first direction past the first operational position and the first dial endwall engages the second body endwall thereby preventing rotation of the dial assembly in the second direction past the second operational position. According to some examples, the dial includes a rotationally fixed dial body that includes the first body endwall and the second body endwall. According to some examples, the dial assembly has a rotatable dial frame that includes the first dial endwall and the second dial endwall. According to some examples, the dial assembly defines a first pocket in which the first spring leg is received and a second pocket in which the second spring leg is received. According to some examples, the first pocket and the second pocket are located between the first dial endwall and the second dial endwall. According to some examples, the dial assembly includes a dividing wall between the first pocket and the second pocket. According to some examples, the dial includes a first lip that engages the second spring leg and a second lip that engages the first spring leg. According to some examples, the dial includes a first lip and a second lip and when the dial assembly is in the first operational position, the first spring leg is spaced apart from the second lip and the second spring leg engages the first lip and when the dial assembly is in the second operational position, the first spring leg engages the second lip and the second spring leg engages the first lip. According to some examples, when the dial assembly is in the initial position, the first spring leg engages the second lip and the second spring leg engages the first lip. According to some examples, the dial includes a spring having the first spring leg and the second spring leg. According to some examples, the dial includes a rotationally fixed dial body having a rod around which the spring is located. According to some examples, the dial includes a rotationally fixed dial body defining a channel in which the spring is located. According to some examples, the sensor assembly is configured to sense rotational movement of the dial assembly. According to some examples, the sensor assembly includes a Hall-Effect sensor. According to some examples, the sensor assembly includes a magnet coupled to and rotatable with the dial assembly. According to some examples, the dial assembly includes a bore and an arm that holds the magnet in the bore, wherein the arm radially extends into the bore.

According to one example of the present disclosure, an operator interface device on a marine vessel for receiving an input from an operator includes a dial configured to receive the input from the operator. The dial includes a dial body that is rotationally fixed relative to the marine vessel and a dial assembly having a dial frame and a dial ring that is configured to be rotated together about a dial axis into and between an initial position, a first operational position, and a second operational position. The dial frame including a first dial endwall and a second dial endwall. The dial also includes a spring with a first spring leg and a second spring leg. Rotation of the dial assembly in a first direction from the initial position toward the first operational position causes the first dial endwall to engage the first spring leg, and when the dial assembly is released, the first spring leg acts on the first dial endwall to return the dial assembly to the initial position. In addition, rotation of the dial assembly in a second direction from the initial position toward the second operational position causes the second dial endwall to engage the second spring leg, and when the dial assembly is released the second spring leg acts on the second dial endwall to return the dial assembly to the initial position. A sensor assembly is configured to sense movement of the dial assembly and generate a signal corresponding to movement of the dial assembly.

According to some examples, the dial body includes a first body endwall and a second body endwall such that the second dial endwall engages the first body endwall thereby preventing rotation of the dial assembly in the first direction past the first operational position and the first dial endwall engages the second body endwall thereby preventing rotation of the dial assembly in the second direction past the second operational position. According to some examples, the dial body includes a first lip that engages the second spring leg and a second lip that engages the first spring leg.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives, and modifications are possible within the scope of the appended claims.

This written description uses examples to disclose the invention and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An operator interface device for a marine vessel, the operator interface device comprising:

a frame configured to couple to the marine vessel;

a dial coupled to the frame and including a first spring leg, a second spring leg and a dial assembly having a first dial endwall and a second dial endwall, the dial assembly is configured to be rotated by an operator about a dial axis into and between an initial position, a first operational position, and a second operational position;

wherein rotation of the dial assembly in a first direction from the initial position toward the first operational position causes the first dial endwall to engage the first spring leg, and wherein when the dial assembly is released the first spring leg acts on the first dial endwall to return the dial assembly to the initial position; and wherein rotation of the dial assembly in a second direction from the initial position toward the second operational position causes the second dial endwall to engage the second spring leg, and wherein when the dial assembly is released the second spring leg acts on the second dial endwall to return the dial assembly to the initial position; and a sensor assembly configured to sense movement of the dial assembly and generate a signal corresponding to the movement of the dial assembly.

2. The operator interface device according to claim 1, wherein the dial further includes a first body endwall and a second body endwall;

wherein the second dial endwall engages the first body endwall thereby preventing rotation of the dial assembly in the first direction past the first operational position; and wherein the first dial endwall engages the second body endwall thereby preventing rotation of the dial assembly in the second direction past the second operational position.

3. The operator interface device according to claim 2, wherein the dial includes a rotationally fixed dial body that includes the first body endwall and the second body endwall.

4. The operator interface device according to claim 2, wherein the dial assembly has a rotatable dial frame that includes the first dial endwall and the second dial endwall.

5. The operator interface device according to claim 1, wherein the dial assembly defines a first pocket in which the first spring leg is received and a second pocket in which the second spring leg is received.

6. The operator interface device according claim 5, wherein the first pocket and the second pocket are located between the first dial endwall and the second dial endwall.

7. The operator interface device according to claim 5, wherein the dial assembly includes a dividing wall between the first pocket and the second pocket.

8. The operator interface device according to claim 1, wherein the dial includes a first lip that engages the second spring leg and a second lip that engages the first spring leg.

9. The operator interface device according to claim 1, wherein the dial includes a first lip and a second lip;

wherein when the dial assembly is in the first operational position, the first spring leg is spaced apart from the second lip and the second spring leg engages the first lip; and wherein when the dial assembly is in the second operational position, the first spring leg engages the second lip and the second spring leg engages the first lip.

10. The operator interface device according to claim 9, wherein when the dial assembly is in the initial position, the first spring leg engages the second lip and the second spring leg engages the first lip.

11. The operator interface device according to claim 1, wherein the dial includes a spring having the first spring leg and the second spring leg.

12. The operator interface device according to claim 11, wherein the dial includes a rotationally fixed dial body having a rod around which the spring is located.

13. The operator interface device according to claim 11, wherein the dial includes a rotationally fixed dial body defining a channel in which the spring is located.

14. The operator interface device according to claim 1, wherein the sensor assembly is configured to sense rotational movement of the dial assembly.

15. The operator interface device according to claim 1, wherein the sensor assembly includes a Hall-Effect sensor.

16. The operator interface device according to claim 15, wherein the sensor assembly includes a magnet coupled to and rotatable with the dial assembly.

17. The operator interface device according to claim 16, wherein the dial assembly includes a bore and an arm that holds the magnet in the bore, wherein the arm radially extends into the bore.

18. An operator interface device on a marine vessel for receiving an input from an operator, the operator interface device comprising:

a dial configured to receive the input from the operator, the dial including:

a dial body that is rotationally fixed relative to the marine vessel;

a dial assembly having a dial frame and a dial ring that are configured to be rotated together about a dial axis into and between an initial position, a first operational position, and a second operational position, the dial frame including a first dial endwall and a second dial endwall; and a spring with a first spring leg and a second spring leg;

wherein rotation of the dial assembly in a first direction from the initial position toward the first operational position causes the first dial endwall to engage the first spring leg, and wherein when the dial assembly is released the first spring leg acts on the first dial endwall to return the dial assembly to the initial position; and wherein rotation of the dial assembly in a second direction from the initial position toward the second operational position causes the second dial endwall to engage the second spring leg, and wherein when the dial assembly is released the second spring leg acts on the second dial endwall to return the dial assembly to the initial position; and a sensor assembly configured to sense movement of the dial assembly and generate a signal corresponding to movement of the dial assembly.

19. The operator interface device according to claim 18, wherein the dial body includes a first body endwall and a second body endwall;

wherein the second dial endwall engages the first body endwall thereby preventing rotation of the dial assembly in the first direction past the first operational position; and wherein the first dial endwall engages the second body endwall thereby preventing rotation of the dial assembly in the second direction past the second operational position.

20. The operator interface device according to claim 18, wherein the dial body includes a first lip that engages the second spring leg and a second lip that engages the first spring leg.

* * * * *